United States Patent [19]
Maehara et al.

[11] Patent Number: 5,333,807
[45] Date of Patent: Aug. 2, 1994

[54] RECORDING AND REPRODUCING APPARATUS HAVING A TAPE TENSION CHANGING MECHANISM

[75] Inventors: Masanori Maehara; Yoshio Kusui; Akira Kumano, all of Kanagawa; Shuji Yoshida, Saitama, all of Japan

[73] Assignee: Sony Corporation, Japan

[21] Appl. No.: 986,251

[22] Filed: Dec. 7, 1992

[30] Foreign Application Priority Data

Dec. 20, 1991 [JP] Japan .................................. 3-338716

[51] Int. Cl.$^5$ ............................................ G11B 15/00
[52] U.S. Cl. .................................................. 242/334.6
[58] Field of Search ............... 242/179, 186, 189, 201, 242/75.41; 360/55, 95, 96.1, 96.2, 96.3

[56] References Cited

U.S. PATENT DOCUMENTS

| | | | |
|---|---|---|---|
| 3,740,492 | 6/1973 | Inaga | 360/85 |
| 3,969,766 | 7/1976 | Tanaka et al. | 360/85 |
| 4,510,534 | 4/1985 | Maeda | 360/85 X |
| 4,527,208 | 7/1985 | Okita et al. | 360/85 |
| 4,750,062 | 6/1988 | Suzuki | 360/85 |
| 4,802,034 | 1/1989 | Matsumoto et al. | 360/85 |
| 4,961,120 | 10/1990 | Mototake et al. | 360/85 |

Primary Examiner—Daniel P. Stodola
Assistant Examiner—John P. Darling
Attorney, Agent, or Firm—Ronald P. Kananen

[57] ABSTRACT

A tape tension mechanism for a recording and reproducing apparatus having a supply reel table and a take-up reel table, in which a tension arm is provided at the supply reel side and rotatably mounted thereon, a brake mechanism for the supply reel table is coupled to the tension arm, and the tension arm is biased by a tension spring so that the brake mechanism performs a braking operation, the tape tension mechanism further includes a movable operation member to which a fixed end of the tension spring for biasing the tension arm is connected, wherein the fixed end of the tension spring is moved close to and apart from a pivot of the tension arm.

10 Claims, 3 Drawing Sheets

RECORDING AND REPRODUCING APPARATUS HAVING A TAPE TENSION CHANGING MECHANISM

BACKGROUND OF THE INVENTION

1. Field of the Invention

The present invention generally relates to tape tension mechanisms for use in recording and reproducing apparatuses and, more particularly, is directed to a tape tension mechanism provided at a supply reel side of a recording and reproducing apparatus such as a video tape recorder.

2. Description of the Prior Art

In a recording and reproducing apparatus, for example, a video tape recorder (VTR), a magnetic tape is likely distorted since it is transported in close contact to a rotary head drum, so that the transporting magnetic tape is required to be always applied with a constant tension which is a force for pulling the tape back, that is, a backward tension. To this end, a tape tension mechanism for maintaining a constant backward tension is provided.

The tape tension mechanism is provided at the supply reel side. The tape tension mechanism includes a tension pin which contacts with the magnetic tape in a tape loading complete condition wherein the magnetic tape taken out of a tape cassette passes a predetermined path, a tension arm for supporting the tension pin, and a tension spring connected at one end thereof to the tension arm to urge it so that the tension pin is moved in contact with the tape to apply a tension to the tape through the tension pin.

FIG. 1 of the accompanying drawings shows a schematic diagram of an example of the thus constituted tape tension mechanism of a conventional VTR. Referring to FIG. 1, a reference numeral 1 denotes a main part of the VTR. Tape reels 4a and 4b are rotatably accommodated in a cassette casing 3 of a tape cassette 2 used in the VTR. A magnetic tape T is fixed at both ends thereof to the tape reels 4a and 4b and wound around them. The tape T extends from a supply side opening of the cassette casing 3 to a take-up side opening thereof respectively provided at opposite ends of a front face of the cassette casing 3 through a tape take-out opening 5 provided at the front face of the cassette casing 3.

A head drum 6 has a rotary magnetic head and is disposed in correspondence to a supply reel table 7a and a take-up reel table 7b. The tape reels 4a and 4b of the tape cassette casing 3 are mounted on the supply reel table 7a and the take-up reel table 7b, respectively. A brake drum 8 is provided coaxially on the supply reel table 7a.

Tape loading blocks 9a and 9b for performing tape loading are formed by mounting guide rollers 11a, 11b and movable inclined guides 12a, 12b on movable bases 10a, 10b, respectively. Tape guide members are further constituted by an impedance roller 13, a pinch roller 14, a swing guide 15 and a capstan 16.

A tape tension mechanism 17 is disposed between the thus disposed tape guide members, that is, the supply reel table 7a and the impedance roller 13.

The tape tension mechanism 17 is constituted by a tension arm 18 pivotally mounted at one end thereof to a chassis side, a tension pin 19 implanted on the other end of the tension arm 18, a tension spring 20 for urging the tension arm 18 to swing to one direction, e.g., counterclockwise, and a brake band 21. One end of the brake band 21 is fixed to the chassis side and wound around the brake drum 8 mounted on the supply reel table 7a and the other end thereof is engaged with the tension arm 18.

In an initial state before the tape loading, the tension arm 18 of the tape tension mechanism 17 is rotated clockwise by a position regulation member (not shown) and held at a position opposite to the supply reel table 7a, that is, in the condition such that the tension pin 19 is positioned within the tape take-out opening 5 of the cassette casing 3 together with the guide rollers 11a, 11b and the movable inclined guides 12a, 12b of the tape loading blocks 9a, 9b and the pinch roller 14.

When the tape loading is performed, the tape loading guide blocks 9a and 9b are moved forwardly, and the tension arm 18 is released from the initial state and rotated counterclockwise by a tension of the tension spring 20 so that the tension pin 19 is abutted on the magnetic tape T in a tape loading complete condition and an intermediate portion of the brake band 21 is wound on the brake drum 18.

Thus, a tension is applied to the magnetic tape T by the tension pin 19 abutted thereon. In this state, when the tension of the magnetic tape T is increased, the magnetic tape T presses the tension pin 19, so that the tension arm 18 is rotated clockwise to decrease a pressure of the brake band 21 against the brake drum 8.

Thus, a rotation load of the supply reel table 7a and the tape reel 4a rotated integrally therewith is decreased and also a winding angle of the magnetic tape T around the tension pin 19 is decreased, so that the backward tension against the magnetic tape T is decreased. Further, when the tension of the magnetic tape T is decreased, the tension arm 18 is rotated counterclockwise to increase a pressure of the brake band 21 against the brake drum 8, so that the rotational load of the supply reel table 7a and the tape reel 4a is increased and the winding angle of the magnetic tape T around the tension pin 19 is increased to thereby increase the backward tension.

The magnetic tape T is transported so that a tension applied thereto is almost constant during recording and reproducing.

In this manner, the magnetic tape T is transported at a constant speed in a state that the backward tension is applied thereto. A fast forward mode of a VTR or the like is performed mainly by the following two methods. According to one method, a rotational speed of a capstan motor is changed to a state where a backward tension is applied to the magnetic tape in the same mode as a recording/reproducing mode or constant speed transporting mode and the pinch roller is abutted on the capstan through the tape. According to a second method, the pressure of the pinch roller against the capstan through the magnetic tape is released and the magnetic tape is directly wound by a winding reel in the fast forward mode.

In the thus constituted recording/reproducing apparatus, in a case of transporting the magnetic tape in the fast forward mode by the above-described first method, there is no necessity of providing a specific fast forward mechanism and so the construction of the apparatus can be simplified. However, since the magnetic tape is transported at a high speed in which the backward tension is applied thereto, then tension of a tape transporting system against the tape is increased due to the fast forward of the tape, so that problems such as damage to the tape and so on tend to occur. Thus, it is required to improve the accuracy of a tape guide system or the like in order to prevent the damage of the tape and so on.

In the case of transporting a magnetic tape in the fast forward mode in the above-described by the second method, since the magnetic tape is wound directly by the winding reel, a limiter torque of the winding reel is required to be changed as compared with a case of a constant speed tape transporting mode, so that the construction of the apparatus is complicated.

OBJECTS AND SUMMARY OF THE INVENTION

It is an object of the present invention to provide an improved tape tension mechanism for a recording and reproducing apparatus in which the aforementioned shortcomings and disadvantages encountered with the prior art can be eliminated.

More specifically, it is an object of the present invention to provide a tape tension mechanism for a recording and reproducing apparatus which can decrease a tension applied to a magnetic tape in a fast forward transporting mode to prevent problems such as the damage of the tape by simplified constructions.

As an aspect of the present invention, there is provided a tape tension mechanism for a recording and reproducing apparatus having a supply reel table and a take-up reel table, in which a tension arm is rotatably provided at the supply reel side, a brake mechanism for the supply reel table is coupled to the tension arm, and the tension arm is biased by a tension spring so that the brake mechanism performs a braking operation, the tape tension mechanism is comprised of a movable operation member to which a fixed end of the tension spring for biasing the tension arm is coupled, wherein the fixed end of the tension spring is moved close to and apart from a pivot of the tension arm.

According to the thus constructed tape tension mechanism for a recording and reproducing apparatus of this invention, when the fixed end of the tension spring is moved close to and apart from the pivot of the tension arm, that is, upon reproducing when the fixed end of the tension spring is moved away from the pivot of the tension arm, the drawing force of the tension spring is increased, so that the tension arm is rotated to the tape side to thereby press the tape by the tension pin and increase a braking force of the brake mechanism applied to the supply reel table side, thereby a backward tension to the tape is increased.

Further, when the fixed end of the tension spring for the tension arm is moved close to the pivot of the tension arm, the drawing force of the tension spring is decreased, so that the tension arm is pressed by a tension of a magnetic tape applied to the tension pin and rotated and further the braking force of the brake mechanism applied to the supply reel table side is decreased, thereby the backward tension applied to the tape being decreased.

Thus, since it becomes possible to change the backward tension applied to the tape freely, the backward tension can be decreased in the fast forward mode of the tape to thereby prevent the damage of the tape or the like.

The preceding and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

Figure 1:
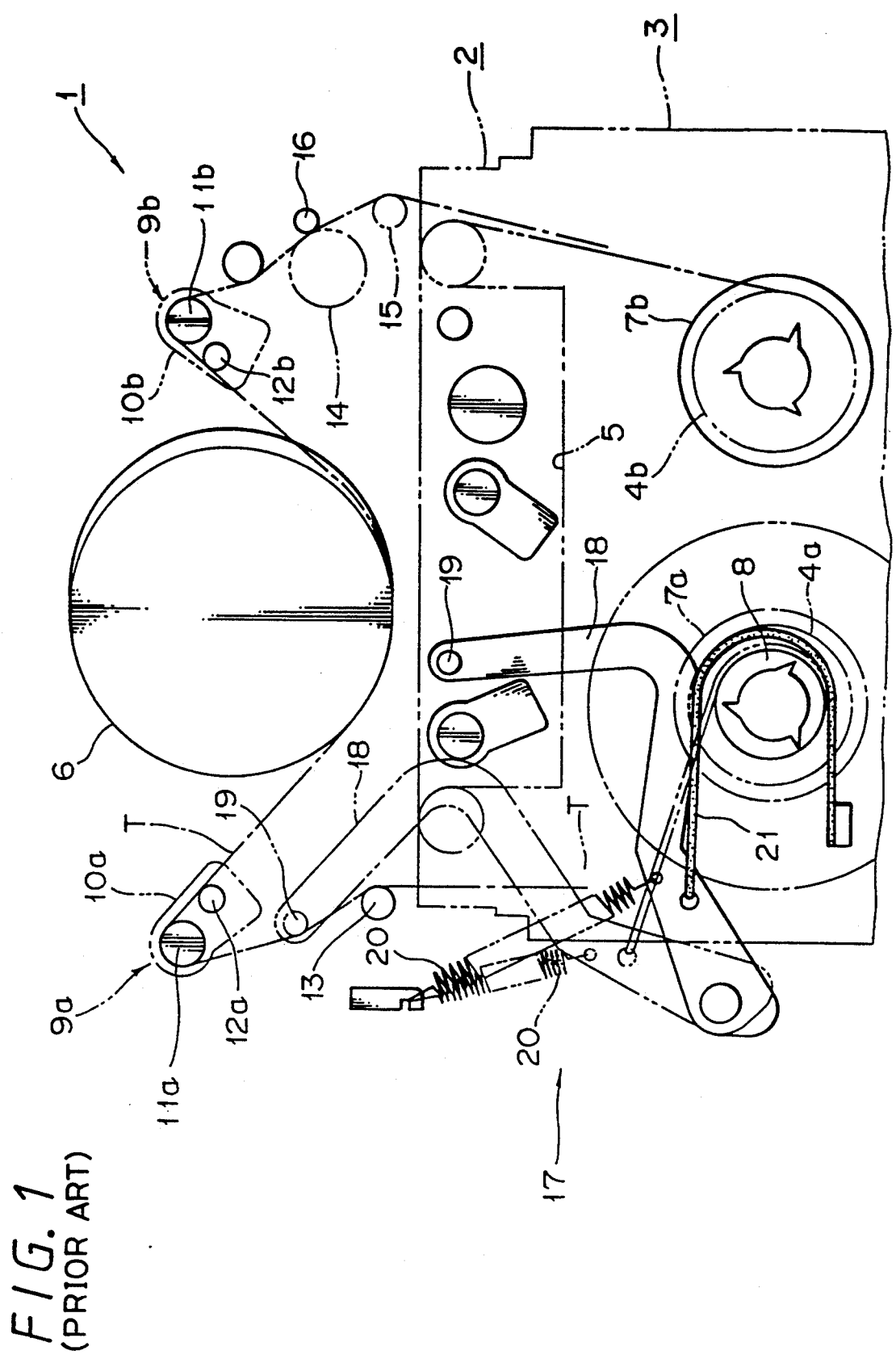
FIG. 1 is a schematic plan view showing an example of a tape tension mechanism of a conventional VTR.
Figure 2:
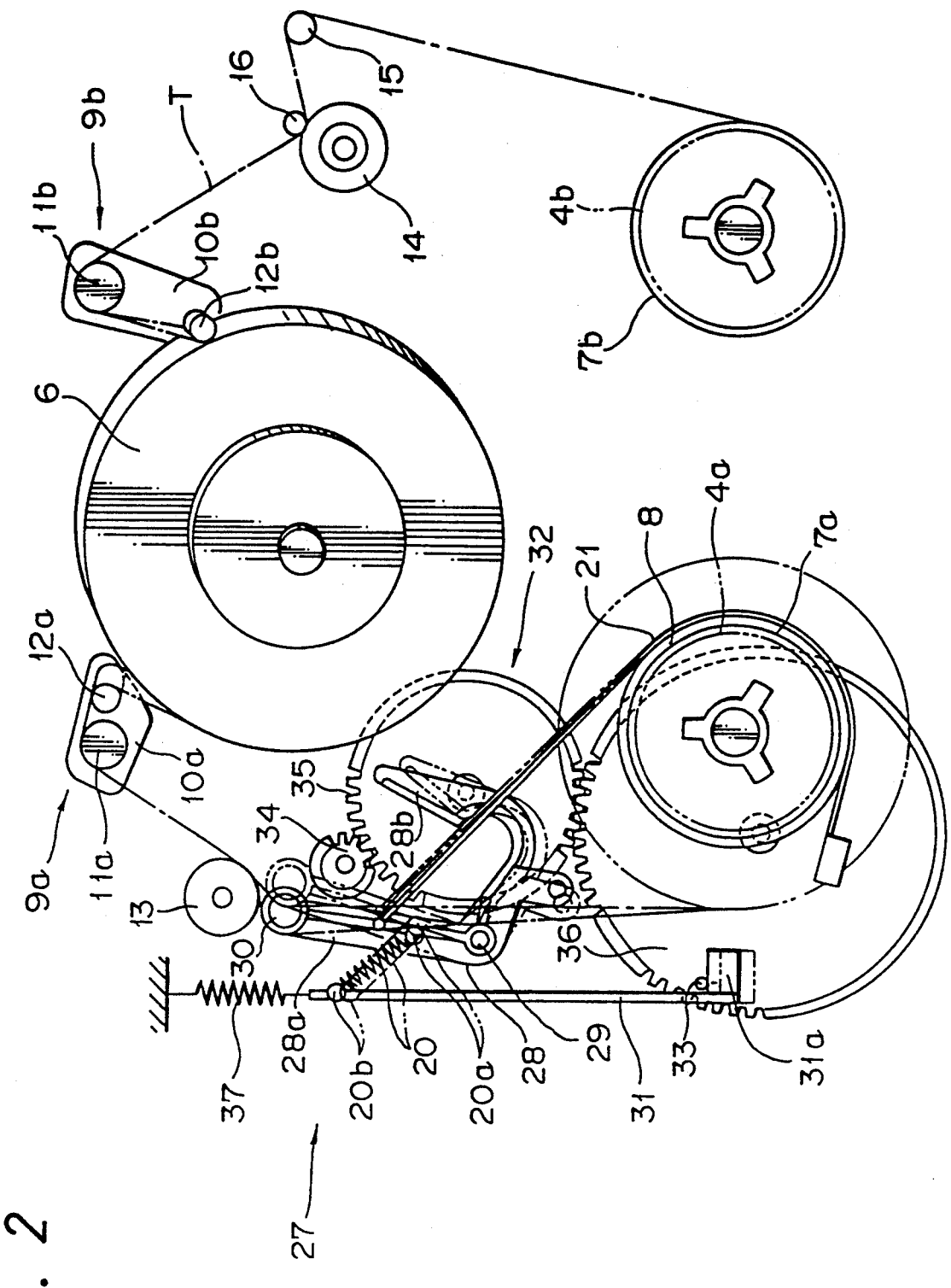
FIG. 2 is a schematic plan view showing a tape tension mechanism for a recording and reproducing apparatus according to a first embodiment of the present invention.

A tape tension mechanism for a recording and reproducing apparatus according to the first embodiment of the present invention will now be described with reference to FIG. 2, in which case the present invention is applied to a VTR. In FIG. 2, portions identical to those of FIG. 1 are referred to by the common symbols, with explanation thereof being omitted.

Referring to FIG. 2, a tension arm 28 of a tape tension mechanism 27 according to the first embodiment is pivotally supported at an intermediate portion thereof by a pivot pin 29 on the chassis. A tension pin 30 is implanted on a tip portion of a first half 28a of the tension arm 28 and a second half 28b thereof is extended so as to correspond to a moving stroke of the tape loading block 9a disposed at an inlet side of the head drum 6.

One end 20a of the tension spring 20 and one end of the brake band 21 are engaged with the first half 28a of the tension arm 28.

The other end or fixed end 20b of the tension spring 20 is latched on a slider 31 serving as a movable operation member which is provided to be slidable to forward and backward directions with respect to the chassis. The slider 31 slides in response to the movement of a cam pin 33 which is moved by a driving gear mechanism 32.

The drive gear mechanism 32 is constituted in a manner that an intermediate gear 35 is engaged with a driving gear 34 which is rotated by a driving motor (not shown) driven in accordance with a predetermined driving signal and a large diameter gear 36 is engaged with the intermediate gear 35. The cam pin 33 is implanted on the large diameter gear 36 and engaged with a front end of an engagement 31a which is provided at a rear end of the slider 31. The cam pin 33 is always engaged with the engagement 31a since the slider 31 is slidably biased to a direction opposite to the drawing direction of the tension spring 20 by a spring 37 having a drawing force larger than that of the tension spring 20.

In the thus constituted tape tension mechanism 27 of this embodiment, when the magnetic tape T is transported at a constant speed upon recording or reproducing, the slider 31 is slid forward to be located in a position indicated by a solid line in FIG. 2 to thereby position the other end 20b of the tension spring 20 forward. In this state, the tension spring 20 biases the tension arm 28 in such a fashion that the tension arm 28 applies a desired backward tension to the magnetic tape T.

In a case of changing the transporting mode of the magnetic tape T from the constant speed mode to the fast forward mode, the driving motor is driven by the fast forward operation to operate the drive gear mechanism 32. That is, the driving gear 34 is rotated by the motor and the rotational force of the driving gear 34 is transmitted to the large diameter gear 36 through the intermediate gear 35. The cam pin 33 implanted on the large diameter gear 36 presses the engagement 31a of the slider 31 backward in an interlocking relation with the rotation of the large diameter gear 36, so that the slider 31 is slid backward against the biasing force of the spring 37.

The other end 20b of the tension spring 20 is shifted backward in response to the backward sliding of the slider 31, so that the other end 20b approaches to the pivot pin 29 of the tension arm 28. Thus, the drawing force of the tension spring 20 applied to the tension arm 28 is decreased, and so the tension arm 28 is pressed by the tension of the magnetic tape T to thereby be rotated and then located at a position shown by a two-dot chain line in FIG. 2.

Therefore, the pressing force of the brake band 21 to the brake drum 8 of the supply reel table 7a is decreased to thereby decrease the backward tension applied to the magnetic tape T.

As described above, in accordance with the embodiment shown in FIG. 2, since the backward tension applied to the magnetic tape T can be changed by shifting the slider 31, the backward tension applied to the tape T can be made small in the fast forward mode, whereby problems such as damage to the tape, can be prevented.

Figure 3:
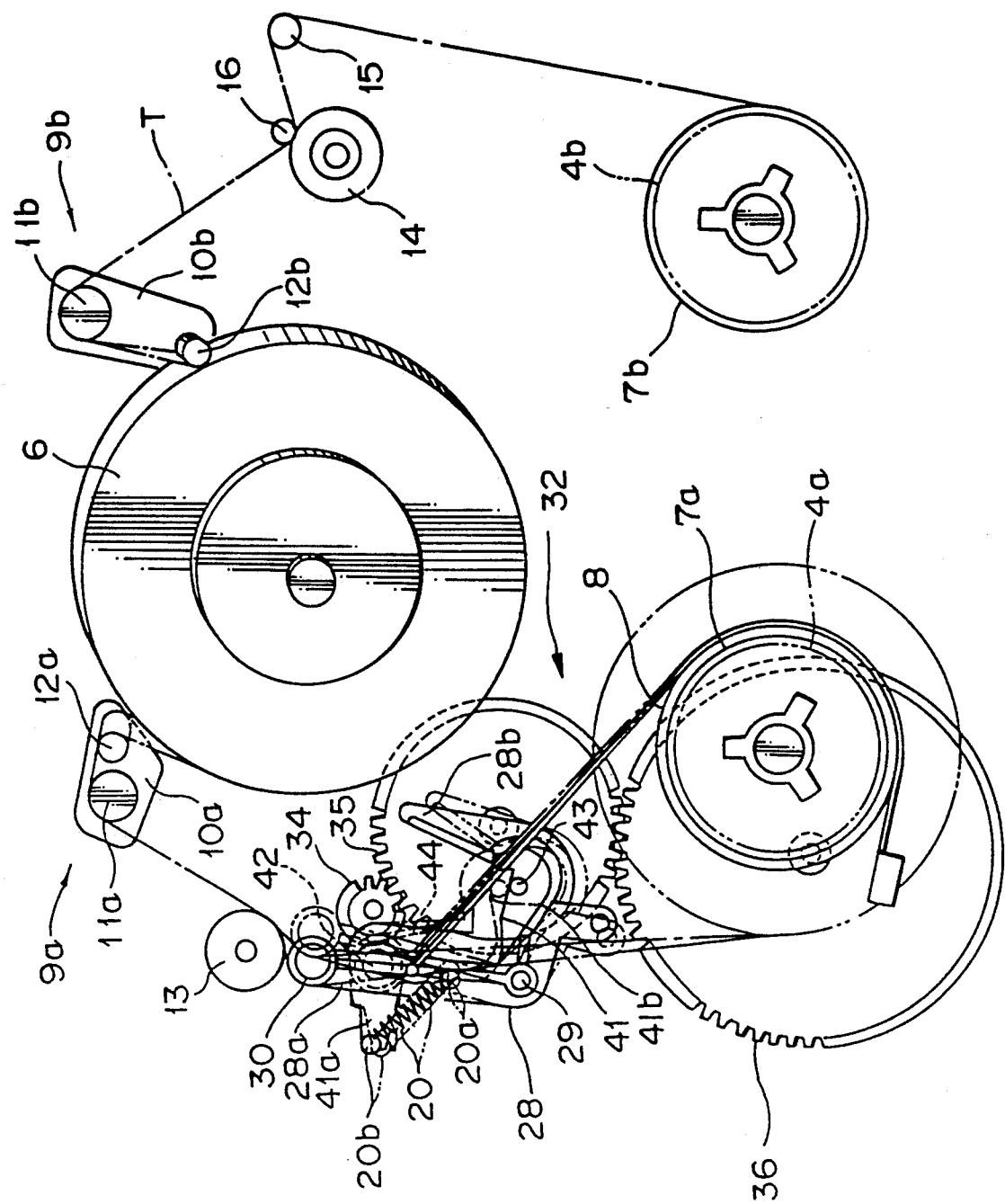
FIG. 3 is a schematic plan view showing the tape tension mechanism for a recording and reproducing apparatus according to a second embodiment of the present invention.

FIG. 3 shows the second embodiment of the present invention, in which portions identical to those of FIG. 2 are referred to by the common symbols, with explanation thereof being omitted. In this embodiment, the movement of the other end 20b of the tension spring 20 with respect to the tension arm 28 is performed by the movement of a rotation lever 41 serving as a movable rotation member as described bellow.

The rotation lever 41 of substantially Z-shaped configuration is positioned in the vicinity of the pivot of the tension arm 28 in such a manner that the rotation lever 41 is pivotally supported at the corner of a front side 41a thereof by a pivot pin 42 on the chassis while a rear side 41b thereof corresponds to the surface of the intermediate gear 35 of the driving gear mechanism 32.

The other end 20b of the tension spring 20 whose one end 20a is coupled to the tension arm 28 is latched on a tip portion of the front side 41a of the rotation lever 41. The rotation lever 41 is rotatively biased to a direction opposite to the drawing direction of the tension spring 20 by a spring 44 having a spring force larger than that of the tension spring 20. A cam pin 43 is implanted on the surface of the intermediate gear 35 which corresponds to the rear side 41b of the rotation lever 41. In a state where the intermediate gear 35 is stopped at a predetermined rotational position, the rear side 41b of the rotation lever 41 is abutted at the rear end thereof on the cam pin 43, thereby the rotation lever 41 is being held at a predetermined rotational position.

In a state where the rotation lever 41 is held at the predetermined rotational position, the tension spring 20 resiliently biases the tension arm 28 so that the tension arm 28 applies a predetermined tension to the magnetic tape T. That is, this state is the state in which a predetermined backward tension is applied to the magnetic tale T in a constant speed transporting mode of the tape T.

In a case of changing the transporting mode of the magnetic tape T from the constant speed transporting mode to the fast forward mode, the driving motor is driven by the fast forward mode operation to operate the drive gear mechanism 32 in the same manner of the first embodiment. That is, the intermediate gear 35 is rotated through the driving gear 34 which is rotated by the driving motor, and then the cam pin 43 presses the rotation lever 41 in response to the rotation of the intermediate gear 35 to thereby rotate the rotation lever 41 counterclockwise against the biasing force of the spring 44 in FIG. 3.

In response to the rotation of the rotation lever 41, the other end 20b of the tension spring 20 approaches to the pivot pin 29 of the tension arm 28. Thus, the drawing force of the tension spring 20 with respect to the tension arm 28 is decreased, and so the tension arm 28 is pressed by the tension of the magnetic tape T to thereby be rotated and then located at a position shown by a two-dot chain line in FIG. 3.

Therefore, the pressing force of the brake band 21 to the brake drum 8 of the supply reel table 7a is decreased to thereby decrease the backward tension applied to the magnetic tape T.

As described above, in accordance with the embodiment shown in FIG. 2, since the backward tension applied to the magnetic tape T can be changed by shifting the rotation lever 41, the backward tension applied to the tape T can be made small in the fast forward mode, thereby problems such as damage to the tape, can be prevented.

According to the thus constituted first and second embodiments, the fast forward of the magnetic tape T is performed in a state where the pinch roller 14 is pressed to the tape T by changing arbitrarily a tension to the tape by a transporting system of the tape similarly to the constant speed transportation during the recording or reproducing mode. Further, since it is not necessary to provide complicated constructions for changing a limiter torque of the winding reel 7b or the like, the constructions of the recording and reproducing apparatus can be simplified.

While the present invention has been particularly shown and described with reference to certain preferred embodiments, it will be readily apparent by those of ordinary skill in the art that various changes and modifications in form and details may be made without departing from the spirit and scope of the invention. For example, the shape or the like of the tension arm may be modified depending on the types of the recording and reproducing apparatus, and the shapes of the slider and the rotation lever each for shifting the position of the other end of the tension spring and the driving mechanism thereof may be modified suitably.

As set out above, according to the present invention, since in the fast forward mode the tension to the tape by the tape transporting system can be changed freely in a state where the pinch roller is pressed to the tape as well as the recording or reproducing mode, the tape is surely prevented from being damaged in the fast forward mode or the like. Further, since it is not necessary to provide complicated constructions for changing a limiter torque of the winding reel or the like, the constructions of the recording and reproducing apparatus can be simplified.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape tension mechanism for a recording and reproducing apparatus having a supply reel table and a take-up reel table, a tension arm rotatably provided at a supply reel side, and a brake mechanism for the supply reel table coupled to the tension arm, the tension arm being biased by a tension spring so that the brake mechanism performs a braking operation, said tape tensioning mechanism comprising:
   a movable operation member to which a fixed end of the tension spring for biasing the tension arm is coupled, wherein the fixed end of the tension spring is moved closer to and further apart from a pivot of the tension arm;
   wherein said movable operation member has an end coupled to the fixed end of the tension spring and mounted to be slidable with respect to a chassis.

2. A tape tension mechanism according to claim 1, wherein upon reproducing when the fixed end of the tension spring is moved away from the pivot of the tension arm, a drawing force of the tension spring is increased, so that the tension arm is rotated to the tape side to thereby press the tape by a pivot pin thereof and increase a braking force of the brake mechanism applied to the supply reel table side, thereby a backward tension to the tape being increased.

3. A tape tension mechanism according to claim 1, wherein when the fixed end of the tension spring is moved close to the pivot of the tension arm, a drawing force of the tension spring is decreased, so that the tension arm is pressed by a tension of a magnetic tape applied to the pivot thereof and rotated and further the braking force of the brake mechanism applied to the supply reel table side is decreased, thereby the backward tension applied to the tape being decreased.

4. A tape tension mechanism according to claim 1, wherein the operation member is operatively coupled to a gear arrangement, the gear arrangement providing a force to the operation member which moves the operation member slidably with respect to the chassis.

5. A tape tension mechanism according to claim 4, wherein the gear arrangement is driven by a motor, the motor driving the gear arrangement such that the movable operation member is moved in a first direction when the recording and reproducing apparatus operates at a first speed and the movable operation member is moved in a second direction opposite to the first direction when the recording and reproducing apparatus operates at a second speed.

6. A tape tension mechanism according to claim 5 wherein said gear arrangement includes a first driving gear, a second intermediate gear and a third large diameter gear coupled to the movable operation member.

7. A tape tension mechanism according to claim 1 wherein the movable operation member is spring biased in a direction substantially opposite to the bias provided by the tension spring.

8. A tape tension mechanism for a recording and reproducing apparatus having a supply reel and an a take-up reel comprising:
   a rotatable tension arm;
   a brake mechanism for said supply reel which is coupled to said rotatable tension arm;
   a tension spring for biasing said tension arm against a tape in said recording and reproducing apparatus; and
   a movable operation member having a first end coupled to said tension spring and coupled to a second spring, said second spring providing a spring force in a direction substantially opposite to the direction of the bias of said tension spring, said spring force of said second spring being greater than that of said tension spring;
   wherein said movable operation member has a second end coupled to a sliding mechanism, said sliding mechanism moving said operation member in a first direction away from said second spring and in a second direction toward said second spring.

9. A tape tension mechanism for a recording and reproducing apparatus according to claim 8 wherein said sliding mechanism includes a gear arrangement.

10. A tape tension mechanism for a recording and reproducing apparatus according to claim 8 wherein said sliding mechanism moves said operation member in said first direction when said recording and reproducing apparatus operates in a constant speed transporting mode and said sliding mechanism moves said operation member in said second direction when said recording and reproducing apparatus operates in a fast forward mode.

* * * * *